Feb. 13, 1934. D. H. MONTGOMERY Re. 19,077

HYDRAULIC APPARATUS

Original Filed July 16, 1927 3 Sheets-Sheet 1

INVENTOR
Donald H. Montgomery
BY
Michael Buchert
ATTORNEYS.

Feb. 13, 1934. D. H. MONTGOMERY Re. 19,077

HYDRAULIC APPARATUS

Original Filed July 16, 1927 3 Sheets-Sheet 2

INVENTOR
Donald H. Montgomery
BY Mitchell Seibert
ATTORNEYS.

Feb. 13, 1934. D. H. MONTGOMERY Re. 19,077

HYDRAULIC APPARATUS

Original Filed July 16, 1927 3 Sheets-Sheet 3

INVENTOR
Donald H. Montgomery
BY
Mitchell & Seibert
ATTORNEYS.

Reissued Feb. 13, 1934

Re. 19,077

UNITED STATES PATENT OFFICE 19,077

HYDRAULIC APPARATUS

Donald H. Montgomery, Berlin, Conn., assignor to New Britain-Gridley Machine Company, New Britain, Conn., a corporation of Connecticut Original No. 1,796,936, dated March 17, 1931, Serial No. 206,190, July 16, 1927. Application for reissue October 17, 1931. Serial No. 569,518

24 Claims. (Cl. 103—40)

This invention relates to an hydraulic apparatus or system which finds special use in connection with a mechanism or device adapted to be actuated with a relatively quick movement followed by a period during which substantially constant pressure is maintained. By way of example, my improved apparatus may be described in connection with work holding chucks, such as a chuck for automatic, semi-automatic or hand operated machines wherein the jaws are moved to grip the work and thereafter a constant pressure is maintained during the cutting operation. My apparatus, however, is not limited to this particular use, it being obvious that it has a more general application and may be used in connection with the rams of presses, brakes, or in other combinations.

An aim of the invention is to provide an apparatus of this character having various features of novelty and advantage and which is very simple in construction and economic and efficient in operation.

More particularly an aim of the invention is to provide an improved arrangement wherein a relatively small power device, such as a pump, may be employed while, at the same time, there is a supply of stored fluid under pressure available to provide for the travel of the actuated member and a constant pressure may be maintained on the actuated member after it has completed its quick or non-working movement. In accordance with one embodiment of the present invention, the arrangement is such that a variable pressure from an accumulator is employed for causing the actuated member to move rapidly during the non-working movement, and the pressure of the pump (which is employed for storing up the energy of a compressible medium in the accumulator) is immediately effective, after the accumulator has performed its function, to exert a constant pressure on the actuated member, which, in the case of a chuck, would be during the cutting time. While the pump is exerting a constant pressure on the actuated member, pressure is being built up in the accumulator by the excess pump capacity.

Considering the broader aspects of the invention it is an object to provide an improved method of and apparatus for actuating or controlling fluid actuated means and employing a plurality of sources of fluid pressure arranged in a novel manner so as to be utilized whether together or one alone in actuating or controlling the fluid actuated means with the desired pressure or pressures at the desired speed or speeds, and economically.

Other objects will be in part obvious and in part pointed out more in detail hereinafter.

The invention accordingly consists in the features of construction, combination of elements and arrangement of parts which will be exemplified in the construction hereinafter set forth and in a new method of employing certain apparatus, the scope of the application of which will be indicated in the appended claims.

In the accompanying drawings, wherein I have shown, for illustrative purposes, a diagrammatic embodiment and a commercial embodiment of the invention:

Figure 1:
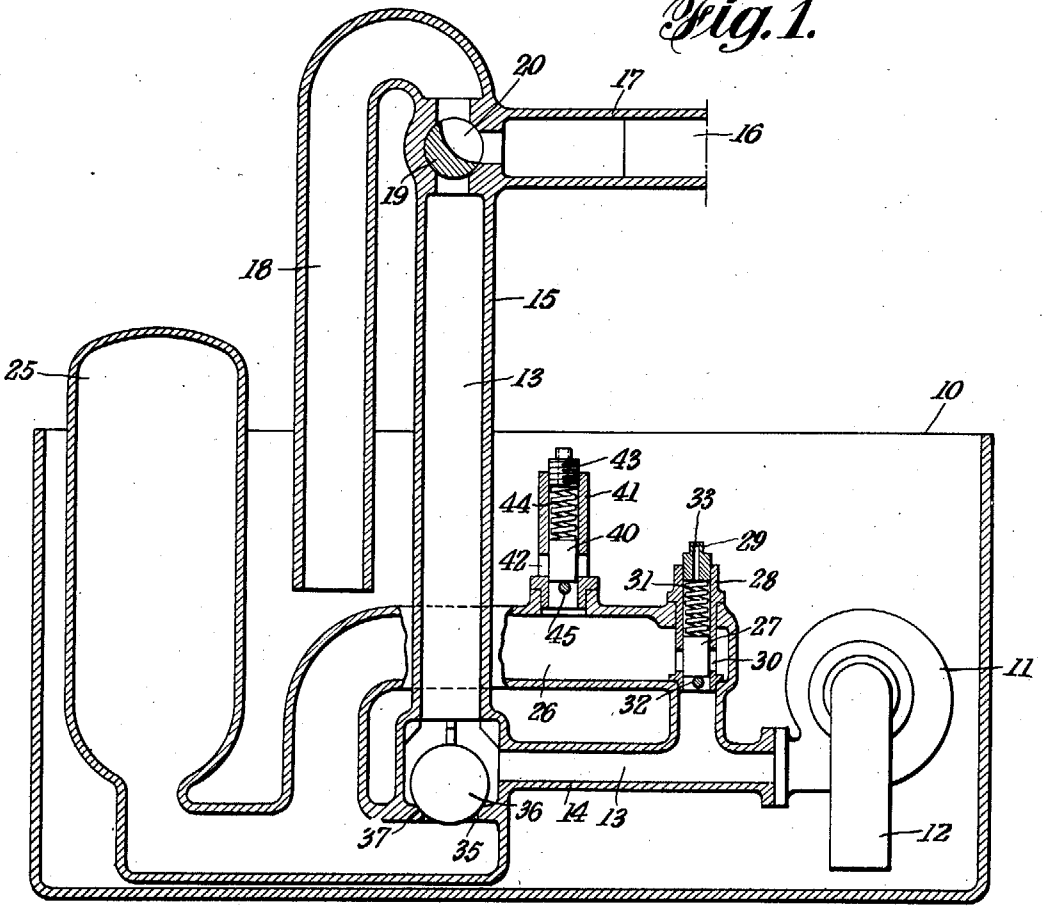
Figure 1 is a vertical sectional view showing my improved system or apparatus more or less diagrammatically.

Referring to the drawings in detail, the diagrammatic embodiment shown in Fig. 1 will first be described in order that the commercial embodiment shown in the other figures may be more readily understood. 10 designates a tank or reservoir in which the hydraulic mechanism is situated. This tank is adapted to contain a suitable fluid, such as oil, which may be employed as the actuating medium. This fluid may vary according to the application of the invention to different uses. Obviously, the hydraulic mechanism may be positioned externally of the tank, and suitable pipes may be run between the tank and the mechanism whereby the fluid is drawn from the tank and is re-delivered thereinto after it passes through the hydraulic mechanism. However, it is of advantage in many cases, to have the hydraulic mechanism in the tank, as it provides for economy in space and construction and eliminates the annoyances incident to leakage in the system. 11 designates a pump of any suitable construction having an inlet 12 communicating with the tank 10. The pump is adapted to deliver the fluid or oil under pressure to a passage 13 which, in the present instance, is formed by two pipes, the horizontal pipe 14 and the vertical pipe 15 which lead to conduit means and the actuated mechanism, only a portion of which latter is here shown as comprising a piston 16, located in a cylinder 17 connected to or forming part of the conduit means. Associated with this piston may be a work holding chuck, the head of a ram or other device to be actuated, depending upon the particular use to which the invention is applied. 18 is a discharge pipe leading back into the tank 10. At the juncture between the pipes 15 and 18 and the cylinder 17 is a valve 19 which may be of any suitable construction so long as it will permit of communication between the passage 13 and the cylinder 17, when the valve is in one position, to result in actuation of the piston, and communication between the cylinder and the discharge pipe 18, when the valve is in another position, so as to permit the fluid behind the piston, after the piston has been actuated, to flow through the discharge pipe 18. A spring, counterbalancing weight, (not shown) or other suitable mechanism may be employed for normally urging the piston to its normal or retracted position; that is to say, towards the left referring to Fig. 1. In the present instance, the valve 19 is of the rotary type and has a port 20. This valve may be operated in any suitable manner.

25 is an accumulator which may be in the form of a cylinder closed at its upper end. The pump 11 is adapted to discharge the fluid through a by-pass 26 into this accumulator and thereby compress the compressible medium in the accumulator so that a pressure is built up therein. The fluid through this by-pass is controlled by a retaining valve 27 of a type which is not subject to back pressure set up in the by-pass to the delivery side of the valve. In the present instance, this retaining valve includes a sleeve or casing 28 in open communication at its lower end with the passage 13 and in open communication at its upper end with the tank 10 or the atmosphere. An adjustable plug 29 is screwed into the open end of the sleeve and has a through port 33. The sleeve has ports 30 opening into the by-pass 26. The valve 27 is in the form of a cylindrical member having a close sliding fit in the sleeve and adapted, when in the position shown in Fig. 1, to close the ports 30. Between the valve and the plug 29 is a spring 31 which normally tends to urge the valve to the closed position shown in Fig. 1. The valve is held in the sleeve by a cross pin 32.

Communication between the accumulator and the passage 13 is had through a port 35 which is controlled by a check valve 36. This valve may be of any suitable construction, but is here shown as being in the form of a ball adapted to engage the seat 37 about the edge of the port 35. This check valve is so arranged that it is normally urged to its seat by the pressure within the passage 13 and is adapted to be raised by the pressure within the accumulator.

The numeral 40 designates a relief valve through which communication is had from the accumulator to the reservoir or tank. In the present instance, this relief valve is similar in construction to the retaining valve heretofore described. It has a sleeve or casing 41 provided with ports 42. The pressure at which the valve will operate may be set by means of a plug 43 acting against the spring 44. The valve is retained within the sleeve by a pin 45.

In explaining the operation of the mechanism, it may be assumed that the relief valve 40 is set so as to be operated by a pressure of one hundred and ten pounds and the pressure retaining valve 27 is set so that it may be operated by a pressure of one hundred pounds. In actual practice, the valves 27—40 would seldom, if ever, be set so as to be operated as stated, and obviously these pressures are referred to by way of example only, it being evident that the valves may be adjusted to operate under pressures other than those stated, so as to meet the requirements at hand; for example, if a constant pump pressure is to be maintained on the actuated device the valve 40 should be set to open at a pressure equal to or less than the pressure at which the valve 27 is set to open. One advantage of the present arrangement which is of considerable importance, is that the working pressure may be very quickly and easily adjusted for each machine or mechanism to which the invention is applied, and also to each individual kind of work which it performs. Upon setting the pump into operation, the valve 19 being in the closed position shown in Fig. 1, the pump fills the passage 13 and when the pressure in this passage reaches one hundred pounds, the fluid will flow into the by-pass and accumulator, thereby compressing the gases in the upper portion of the air bell. When the pressure of the gases has reached one hundred and ten pounds, the valve 40 is operated so as to take care of the incoming fluid from the pump, it being understood that the pump continuously operates. When the valve 19 is turned to open communication between the passage 13 and cylinder 17, the compressed gases in the accumulator expand very rapidly, thereby causing the fluid in the passage to quickly actuate or move the piston 16 thereby causing the chuck jaws to grip the work in case a chuck mechanism is associated with the piston. When the accumulator discharge ceases the check valve 36 reseats itself. In the meantime the pump is continuing to operate and, as the passage 13 is filled with liquid, as soon as the check valve moves back to its seat a pressure of one hundred pounds is built up in the passage 13 and the cylinder, although the pressure in the accumulator and by-pass may have fallen far below one hundred pounds. There may be a slight momentary drop below one hundred pounds against the piston, but this drop is of such duration as to be practically negligible. The pressure retaining valve 27 will maintain one hundred pounds pressure in the passage 13 and the cylinder 17 and thus a constant pressure is exerted against the chuck jaws during the cutting operation. After a pressure of one hundred pounds is reached in the passage 13, the incoming fluid from the pump will flow by the pressure retaining valve 27 so as to start to build up a pressure in the accumulator. The cutting operation having been completed, the valve 19 will be turned to the position shown in Fig. 1, cutting off the pressure from the pump and accumulator allowing the piston to return ready to start another cycle as soon as the valve 19 is moved to the correct location. It will be observed that, so long as the displacement of the piston 16 is less than the rate of delivery of the pump to the passage 13, the pump is doing the work and a constant pressure is maintained thereby against the piston, that pressure being determined by the setting of the apparatus. However, when the movement of the piston is such that its displacement is greater than the rate of delivery of the pump, the accumulator comes into play and then, when the piston slows down below that point, the accumulator is cut out. For the successful operation of the apparatus, it is not necessary that a pressure be built up in the accumulator equal or in any given ratio to the working pressure being used. It is only necessary to build up a pressure in the accumulator sufficient to carry the piston or other device quickly to the working position. It is of considerable importance to note that the pressure retaining valve is of a design not affected by back pressure so that it will always be operated at the same pressure at which it is adjusted to operate irrespective of the pressure in the by-pass. Obviously, the setting of the pressure retaining valve may be changed at any desired time during the normal operation of the apparatus so as to effect certain results depending on the use to which the invention is placed. For example, if the apparatus were used in connection with brakes, the retaining valve may be re-set in any suitable manner immediately after the energy of the accumulator has brought the brakes to application position in order that the pressure built up by the pump against the actuated member would be greater than that pressure at which the retaining valve was originally set. This would be of particular advantage in case of emergency application of the brakes. The setting of the valve, of course, could be changed by turning down the plug 29, thereby increasing compression of the spring 31.

Figure 2:
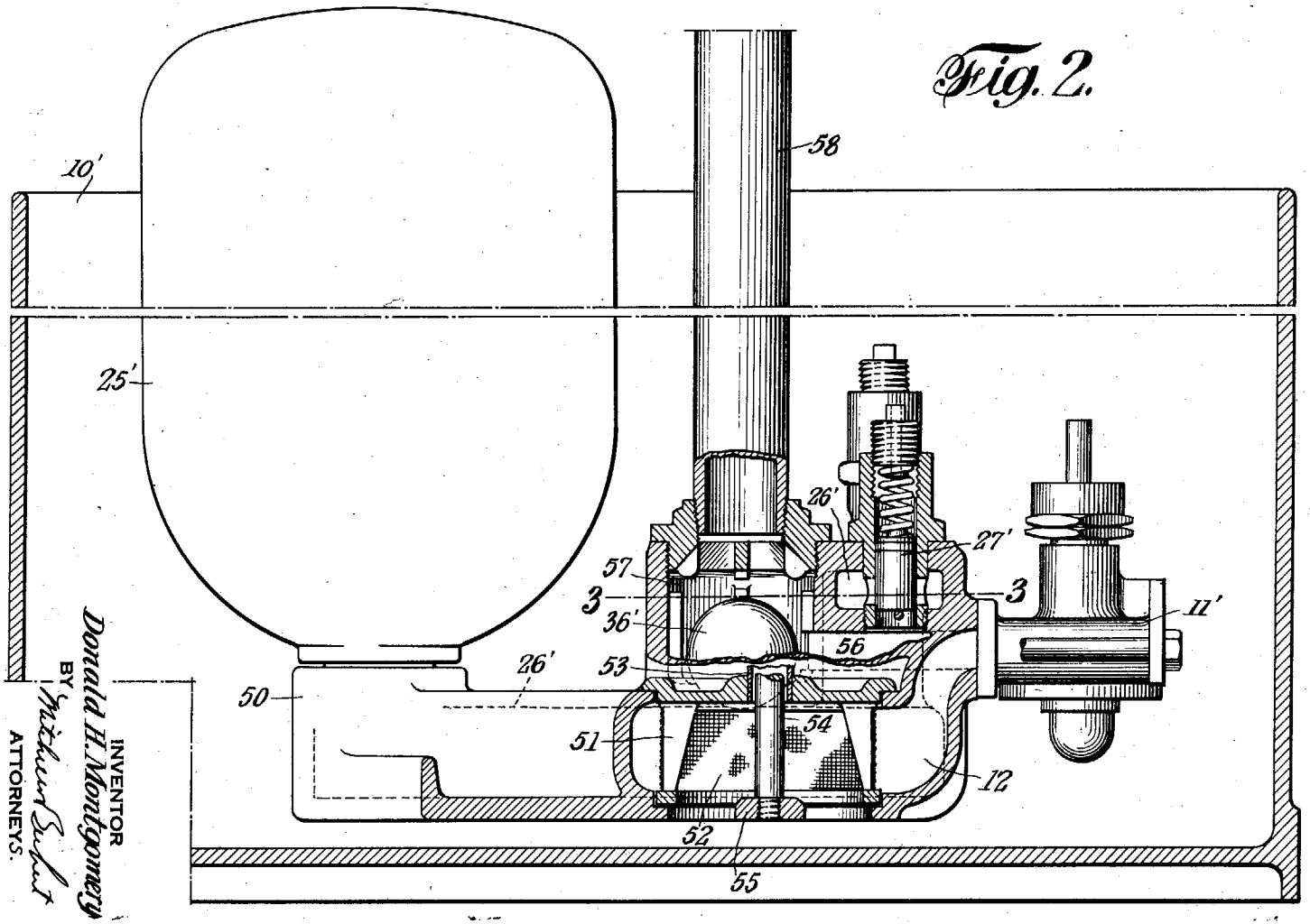
Fig. 2 is a view similar to Fig. 1, but showing a commercial embodiment, parts of the apparatus shown in this figure being in section along the line 2—2 of Fig. 3.
Figure 3:
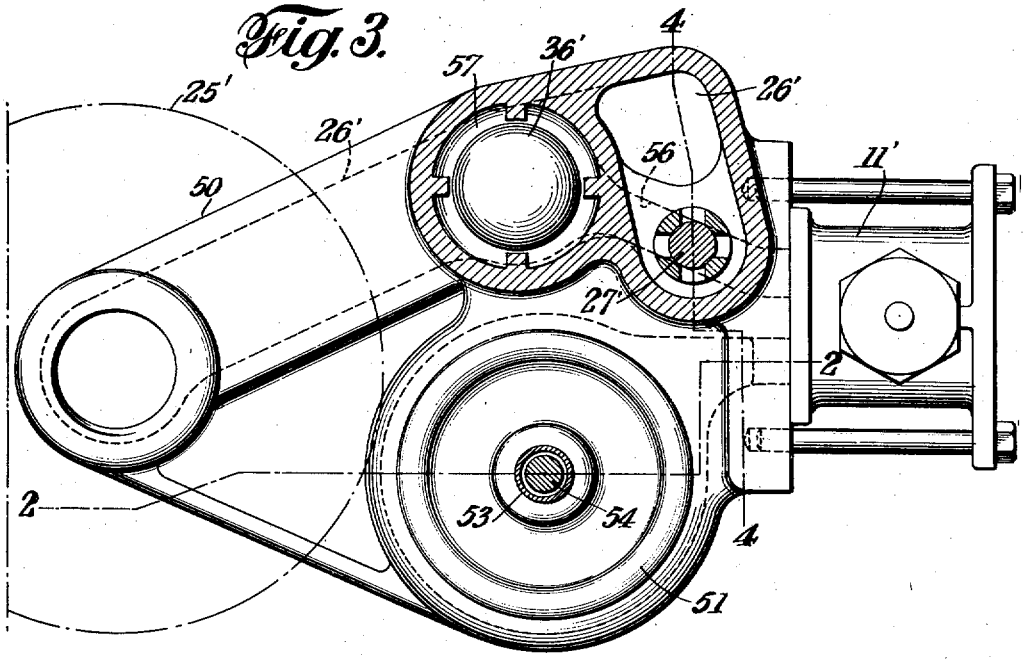
Fig. 3 is a top plan view of the apparatus of Fig. 2 with parts in section, the section being taken substantially on the line 3—3 of Fig. 2.
Figure 4:
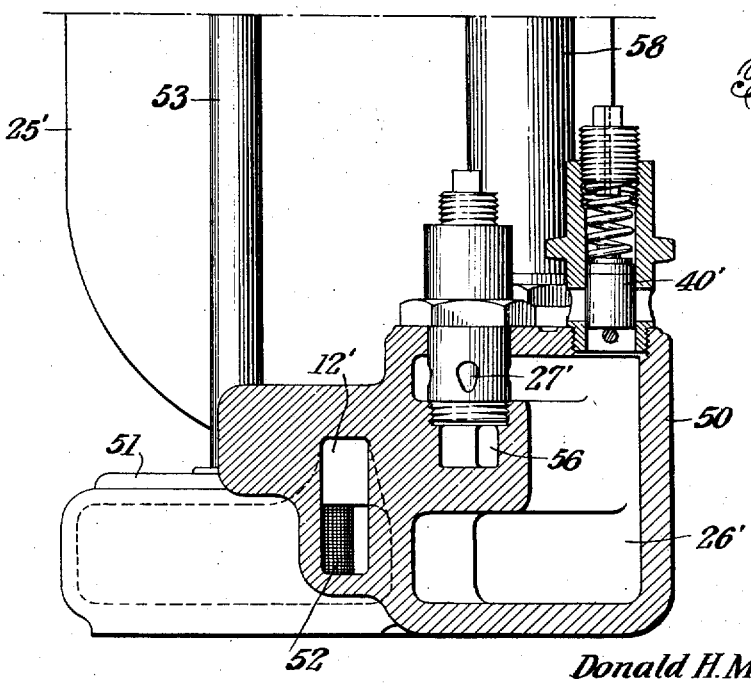
Fig. 4 is a vertical transverse view taken substantially on line 4—4 of Fig. 3.

Referring now to the embodiment shown in Figs. 2, 3 and 4, the hydraulic mechanism is located within a tank 10′ as is the case with the preceding embodiment. This mechanism includes a casting 50 having an inlet 12′ leading to the pump 11′. In the inlet 12′ is positioned a strainer having a frame 51 at its bottom in order that the inlet may communicate with the interior of the tank. For the purpose of facilitating positioning of the strainer in place, the top of the strainer may carry a tube 53 which receives and is guided by a rod 54 arising from a cross rib 55 forming a portion of the casting. The pump delivers to a horizontally extending opening 56 which leads to a valve chamber 57. Arising from this valve chamber is a pipe 58. This pipe 58 may be provided with a valve, such as the valve 19 of Fig. 1, for controlling the fluid to and from the chuck operating mechanism. The opening 56, the valve chamber 57 and the opening through the pipe 58 constitute a passage which is comparable to the passage 13 of the diagrammatic embodiment shown in Fig. 1. Leading from the opening 56 to the accumulator 25′ is a by-pass 26′. This by-pass starts above the opening 56, goes down back of this opening, then horizontally under the pipe 58 and behind the strainer and then to the accumulator. Between the opening 56 and the by-pass is the pressure retaining valve 27′. The pressure relief valve is designated by the numeral 40′, and the check valve by the numeral 36′. These valves are similar to, and perform the same function as, the respective valves 27 and 40 and 36 of Fig. 1.

The operation of the structure shown in Figs. 2, 3 and 4 is identical to that heretofore described in connection with Fig. 1.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween. For instance, the term "predetermined pressure" may be taken as meaning a selected pressure, whether that pressure is determined prior to or during the operation of the apparatus.

What I claim as my invention is:

1. In an apparatus of the character described, a chamber or passage, an accumulator, a pump for delivering fluid under pressure to said passage and said accumulator, means for preventing fluid from flowing into said accumulator until a predetermined pressure is built up in said passage by said pump, and means for establishing communication from said accumulator to said passage when the pressure in said passage falls below that of said accumulator.

2. In an apparatus of the character described, a chamber or passage, a pump for delivering a liquid under pressure to said passage, an accumulator adapted to receive liquid from said passage and to deliver to said passage, means between said passage and accumulator for preventing the liquid from flowing from the passage into said accumulator until a predetermined pressure is built up in said passage by said pump, and means for permitting said accumulator to deliver to said passage when the pressure in said passage falls below that of said accumulator.

3. In an apparatus of the character described, a chamber or passage, a continuously operated device for delivering liquid under pressure to said passage, an air bell adapted to receive liquid from said passage and to deliver to said passage, means between said passage and air bell for preventing the liquid from flowing from the passage into said bell until a predetermined pressure is built up in said passage by said device, and a check valve for preventing said passage from delivering into said bell while the pressure in said passage is above that of said bell, said bell being adapted to deliver past said check valve to said passage when the pressure in the latter falls below that of the bell.

4. In an apparatus of the character described, a passage, a pump adapted to deliver fluid under pressure to said passage, an accumulator adapted to receive fluid from said passage and deliver to said passage, means between said passage and accumulator for preventing the fluid from flowing from the passage to the accumulator until a predetermined pressure has been built up in the passage, means for permitting communication from said accumulator to said passage when the pressure in said passage falls below that of said accumulator, and means for permitting escape of fluid from the system when a predetermined pressure is reached therein.

5. In an apparatus of the character described, a passage, a pump adapted to deliver fluid under pressure to said passage, an accumulator adapted to receive fluid from said passage and to deliver to said passage, means between said passage and accumulator for preventing the fluid from flowing from the passage to the accumulator until a predetermined pressure has been built up in the passage, means for permitting communication from said accumulator to said passage when the pressure in said passage falls below that of said accumulator, and a relief valve for the system.

6. In an apparatus of the character described, a passage, a continuously operated pump adapted to deliver fluid under pressure to said passage, an accumulator, a pressure retaining valve between said passage and accumulator for preventing the fluid from flowing from the passage to the accumulator until a predetermined pressure has been built up in the passage, a check valve for preventing communication from said passage to said accumulator while the pressure in said passage is above that of said accumulator, and a relief valve for the system.

7. In an apparatus of the character described, a chamber, a continuously operated device for delivering a liquid to said chamber, an accumulator, a pressure retaining valve unaffected by back pressure between said chamber and accumulator for maintaining a predetermined pressure in said chamber, a check valve between said chamber and accumulator and opened by the pressure of the latter, and a relief valve to the delivery side of said pressure retaining valve.

8. In an apparatus of the character described, a passage or chamber, a pump for delivering a liquid to said chamber, an accumulator, an opening between said accumulator and chamber, a check valve controlling said opening, a by-pass between said chamber and accumulator, a pressure retaining valve controlling the flow of liquid from said chamber to said by-pass, and a relief valve for preventing the pressure in the system from exceeding a predetermined pressure.

9. In an apparatus of the character described, a chamber or passage, an accumulator, a pump for delivering fluid under pressure to said passage and said accumulator, means, not subject to back pressure, for preventing fluid from flowing into said accumulator until a predetermined pressure is built up in said passage by said pump, and means for establishing communication from said accumulator to said passage when the pressure in said passage falls below that of said accumulator.

10. In an apparatus of the character described, a chamber or passage, variable pressure means, means for delivering fluid under pressure to said passage and said variable pressure means, means for preventing fluid from flowing up into said variable pressure means until a predetermined pressure is built up in said passage by said means for delivering fluid, and means for establishing communication from said variable pressure means to said passage when the pressure in said passage falls below that of said variable pressure means.

11. In an apparatus of the character described, a chamber, a variable pressure accumulator, continuously operating means for delivering fluid under pressure to said passage and said accumulator, means for preventing fluid from flowing into said accumulator until a predetermined pressure is built up in said passage by said continuously operating means, means for establishing communication from said accumulator to said passage when the pressure in said passage falls below that of said accumulator, and a relief valve for the system.

12. In an apparatus of the character described, a chamber or passage, a pump for delivering liquid under pressure to said passage, a variable accumulator, a by-pass between said passage and accumulator through which said accumulator receives the liquid from said passage, a port between said accumulator and passage and through which said accumulator is adapted to discharge into said passage, means for preventing the liquid from flowing through said by-pass from the passage to said accumulator until a predetermined pressure is built up in said passage by said pump, and means for closing said port while the pressure in said passage is above that of said accumulator.

13. In a device of the character indicated, conduit means, a pump, an accumulator, means for connecting said conduit means to said pump and to said accumulator, and said pump and accumulator to each other including a check valve, loaded valve means between said pump and accumulator to prevent discharge from said pump to said accumulator until said pump builds up a pressure corresponding to the loading of said valve, whereby said pump pressure may be maintained on said conduit means while said accumulator is being charged by said pump.

14. In a device of the character indicated, conduit means, a pump to be connected to said conduit means for supplying fluid pressure thereto, an accumulator to be connected to said conduit means for supplying fluid pressure thereto, control valve means for controlling the connection of said accumulator and said pump to said conduit means, and means of communication between said pump and accumulator including means to prevent a flow of fluid from said pump to said accumulator until a predetermined pressure is built up by said pump.

15. The method of acting on a conduit means which comprises, subjecting the means to the influence of pressure fluid from one source until the pressure thereof falls substantially and thereafter maintaining the means under the influence of pressure fluid from another source at substantially constant pressure, and at times connecting the two sources of pressure.

16. The method of acting on a conduit means which comprises subjecting the same to pressure from a source of pressure fluid and storing under variable pressure an excess of fluid from said source while maintaining said pressure on said conduit means substantially constant.

17. The method of employing a system including a pump, an accumulator and a conduit means comprising, discharging fluid from the accumulator to the conduit means at a rate in excess of the capacity of the pump to deliver fluid and thereafter cutting off communication between the accumulator and conduit means and subjecting the latter to pressure fluid from the pump and maintaining the pump pressure substantially constant and then while the conduit means is subjected to substantially constant pump pressure delivering fluid from the pump to the accumulator at the pump pressure to which the conduit means is subjected while the accumulator is under a lower pressure.

18. The method of acting on conduit means comprising discharging fluid under pressure thereto from one source of pressure fluid, then cutting off such discharge and subjecting said means to the pressure of pressure fluid from a different source and maintaining said last mentioned pressure substantially constant, and connecting the two sources while maintaining said means subject to said pressure of said different source.

19. The method of utilizing a substantially continuous flow of fluid under pressure in a system including conduit means which comprises, maintaining the conduit means under a substantially constant pressure of said fluid, and storing under pressure an excess of such fluid while maintaining said conduit means under substantially constant pressure, then exhausting said conduit means, and thereafter subjecting the same to the pressure of the stored pressure fluid.

20. The method of employing a pump and an accumulator to act upon a conduit means which comprises, delivering fluid from the pump to the accumulator only when a predetermined pressure has been built up by the pump, and thereafter delivering liquid simultaneously from the pump and the accumulator to the conduit means.

21. The method of employing a pump and an accumulator to act upon a conduit means which comprises, charging the accumulator from the pump after a predetermined pressure is built up by the pump and thereafter conducting liquid to the conduit means simultaneously from the pump and accumulator, and thereafter leaving said pump and conduit means in pressure communication and cutting off pressure communication from the accumulator to the conduit means.

22. The method of employing a pump and an accumulator in a system of the character indicated which comprises subjecting a conduit means to pressure of fluid from a charged accumulator and pump simultaneously until the accumulator is partly discharged, then cutting the accumulator off from the conduit means, then permitting the pump to build up a predetermined substantially constant pressure and thereafter recharging the accumulator from the pump while maintaining said substantially constant pressure.

23. The method of employing an accumulator and a pump in a system of the character indicated which comprises, storing under variable pressure in the accumulator fluid from the pump while maintaining the pump pressure substantially constant.

24. The method of employing a pump and an accumulator with a conduit means which comprises, subjecting the conduit means to a predetermined pressure of fluid from the pump, maintaining that pressure on the conduit means, and while maintaining that pressure on the conduit means charging the accumulator by the pump.

DONALD H. MONTGOMERY.